United States Patent Office 3,488,313
Patented Jan. 6, 1970

3,488,313
PROCESS FOR STOPPING PEPTISATION OF POLYCHLOROPRENE LATEX
Anthony Archibald Sparks, Epsom Downs, Surrey, and Robert Charles Moore, Sutton, Surrey, England, assignors to The Distillers Company Limited, Edinburgh, Scotland, a British company
No Drawing. Continuation-in-part of application Ser. No. 374,287, June 11, 1964. This application Nov. 25, 1966, Ser. No. 596,822
Claims priority, application Great Britain, July 3, 1963, 26,330/63
Int. Cl. C08d 5/02, 7/00
U.S. Cl. 260—29.7       4 Claims

ABSTRACT OF THE DISCLOSURE

Peptization of sulphur modified polychloroprene latex may be stopped according to a two step process which comprises peptizing an aqueous latex of sulphur modified polychloroprene at a temperature in the range of 35° C. to 60° C. with a tetra alkyl thiuram disulphide and a dialkyl dithiocarbamate and thereafter adjusting the temperature of the peptized latex before peptization is complete to a temperature less than 20° C., such temperature being greater than that required to cause the latex to coagulate.

---

The present invention relates to a process for stopping certain processes for the peptisation of sulphur modified polychloroprene. The application is a continuation-in-part application of U.S. application Ser. No. 374,287 filed on June 11, 1964, now abandoned.

By the term sulphur modified polychloroprene is meant throughout this specification any synthetic rubber formed by polymerising 2-chloro-1,3-butadiene or 2-chloro-1,3-butadiene and a copolymerisable monomer in aqueous emulsion in the presence of sulphur. By the term petisation is meant throughout this specification the breakdown or partial breakdown of the sulphur modified polychloroprene to give a product having the desired degree of plasticity for processing by the methods used commercially.

The process for the peptisation of sulphur modified polychloroprene according to the present invention comprises peptising at a temperature in the range 35 to 60° C. an aqueous latex of a sulphur modified polychloroprene with a tetra alkyl thiuram disulphide and a dialkyl dithiocarbamate and adjusting the temperature of the peptised latex before peptisation is complete to a temperature less than 20° C. and greater than the temperature which is sufficient to cause the latex to coagulate.

Most suitably the alkyl groups in the tetra alkyl thiuram disulphide and the dialkyl dithiocarbamate have 1 to 6 carbon atoms. Most suitably the dialkyl dithiocarbamates are the dialkyl ammonium dialkyl dithiocarbamates.

The preferred peptising systems are those containing tetra ethyl thiuram disulphide and dimethyl ammonium dimethyl dithiocarbamate. Most suitably the temperature at which peptisation is carried out should be such as to give a rate of peptising reaction which gives rise to the desired product in a commercially acceptable time, for example a minimum of about 1 hour and preferably a time in the range 3 to 5 hours. The preferred temperature is in the range 40 to 50° C.

It is essential to adjust the temperature of the latex to less than 20° C. to stop the peptisation. It is preferred to carry out the process by adjusting the temperature of the latex to between 10 to 12° C.

It is surprising that adjusting the temperature of the latex to less than 20° C. immediately stops the peptisation reaction. It would have been natural to assume that lowering the temperature would merely slowed the reaction down.

The present invention provides a process for stopping the stated peptisation process for sulphur modified polychloroprene at any desired stage, thus enabling the use of relatively high concentration of sulphur in the original polymerisation process. Furthermore rubbers having particularly desirable properties can be obtained from the partially peptised latex.

Example 1

An aqueous latex of a curable sulphur modified polychloroprene having a pH of 11.0 was prepared using well known emulsion polymerisation procedures in which a minor proportion of sulphur was present in the emulsion and potassium persulphate used as the polymerisation initiator. The polymerisation was short stopped at an approximately 85% conversion by the addition of 0.1% (weight/weight on monomer) dimethyl ammonium dimethyl dithiocarbamate.

The temperature of samples of the latex were adjusted to approximately 40° C. which is that preferred for peptisation and then a tetraethyl thiuram disulphide emulsion was added to each latex sample to give a concentration of thiuram of 2.0% (weight/weight on monomer).

A sample of the latex was allowed to peptise for 6 hours at a temperature of 40° C. and then the temperature was adjusted to 10 to 12° C. By way of comparison a second sample of the latex was allowed to peptise for 24 hours at a temperature of 40° C. At frequent intervals the pH value of a portion of each latex sample was adjusted to 7.0 by addition of 10% acetic acid, the rubber isolated by freeze coagulation and dried in an air oven. The change in Mooney viscosity of the rubber isolated in relation to the peptisation time of the latex is shown in Table 1 which illustrates that the peptisation reaction is stopped by adjusting the temperature to 10 to 12° C.

TABLE 1

| Sample | Temperature of peptisation in ° C. | Mooney viscosity, (ML4') after— | | | | | | |
|---|---|---|---|---|---|---|---|---|
| | | 1.5 hours | 3.5 hours | 6 hours | 8 hours | 12 hours | 18 hours | 24 hours |
| Control | 40 | 113 | 71 | 54 | 47 | 44 | 42 | 41 |
| Example | ¹40 | 113 | 71 | 54 | 54.5 | 54 | 54.5 | 54 |

¹ For 6 hours then 10-12° C.

Example 2

An aqueous latex of a curable sulphur modified polychloroprene having a pH of 11 was prepared and peptised in accordance with the procedure described in Example 1. A control sample of the latex was peptised for 12 hours at a temperature of 40° C. Another sample (a) of this latex was peptised for 4 hours at 40° C. and then the temperature adjusted to 12 to 20° C. A further sample (b) of the sample of the latex was peptised for 4 hours at 60° C. and then the temperature adjusted to 10 to 12° C. The samples were then treated in a similar manner to that described in Example 1 and the changes in Mooney viscosity of the rubber isolated in relation to peptisation time for each sample is shown in Table 2. The results illustrate that the peptising reaction is stopped by adjusting the temperature to 10 to 12° C.

TABLE 2

| Sample | Temperature of peptisation in ° C. | Mooney viscosity, (ML4') after— | | | | |
|---|---|---|---|---|---|---|
| | | 1 hour | 4 hours | 6 hours | 8 hours | 12 hours |
| Control | 40 | | 48 | 41 | 36 | 31 |
| Sample (a) | 40 for 4 hours then 12-20° C | | 46 | 43 | 43 | 43 |
| Sample (b) | 60 for 4 hours then 10-12° C | 45 | 45 | 34 | 33 | 34 |

Example 3

An aqueous latex of a curable sulphur modified polychloroprene having a pH of 11 was prepared and peptised in accordance with the procedure described in Example 1.

A control sample 1 of latex was peptised for 12 hours at 40° C., a second control sample 2 was peptised for 12 hours at a temperature of 20° C. and a third sample (a) peptised for 3 hours at 40° C. and then the temperature was adjusted to 10 to 12° C. The samples were then treated in a similar manner to that described in Example 1 and the changes in Mooney viscosity of the rubber isolated in relation to peptisation time for each sample is shown in Table 3.

This data given illustrates that where the latex is first peptised at 40° C. peptisation is stopped by adjusting the temperature to 10 to 12° C. and that by way of comparison peptisation will take place at a temperature of 20° C. when the latex has not been initially peptised at higher temperatures.

TABLE 3

| Sample | Temperature of peptisation in ° C. | Mooney viscosity, (ML4') after— | | | | |
|---|---|---|---|---|---|---|
| | | 1 hour | 3 hours | 5 hours | 8 hours | 12 hours |
| Control(1) | 40 | 110 | 72 | 56 | 50 | 43 |
| Control(2) | 20 | 110 | 93 | 91 | 70 | 60 |
| Sample(a) | 40 for 3 hours then 10-12° C | 111 | 71 | 67 | 69 | 68 |

Example 4

An aqueous latex of a curable sulphur modified polychloroprene having a pH of 11 was prepared and peptised in accordance with the procedure described in Example 1. A control sample of latex was peptised for 8¼ hours at 35° C., a second sample of the latex was peptised at 35° C. for 5 hours and then the temperature adjusted to 10 to 12° C. The samples were then treated in a similar manner to that described in Example 1 and the changes in Mooney viscosity of the rubber isolated in relation to peptisation time for each sample is shown in Table 4.

TABLE 4

| Sample | Temperature of peptisation in ° C. | Mooney viscosity, (ML4') after— | | | |
|---|---|---|---|---|---|
| | | 4 hours | 5 hours | 5.5 hours | 8.25 hours |
| Control | 35 | 79 | 70 | | 58 |
| Example | 35 for 5 hours then 10-12° C | 82 | 70 | 68 | 70 |

Example 5

An aqueous latex of a curable sulphur modified polychloroprene having a pH of 11 was prepared and peptised in accordance with the procedure described in Example 1.

A control sample of the latex was peptised for 8½ hours at a temperature of 50° C. A second sample of the latex was peptised at 50° C. for 5 hours and then the temperature adjusted to 10 to 12° C. The samples were treated in a similar manner to that described in Example 1 and the changes in Mooney viscosity of the rubber isolated in relation to peptisation time for each sample is shown in Table 5.

TABLE 5

| Sample | Temperature of peptisation in ° C. | Mooney viscosity, (ML4') after— | | | |
|---|---|---|---|---|---|
| | | 4.5 hours | 5.5 hours | 6.75 hours | 8.5 hours |
| Control | 50 | 55 | 43 | | 38 |
| Example | 50 for 5 hours then 10-12° C | 55 | | 43 | 43 |

We claim:

1. A process for the peptization of sulphur modified polychloroprene to produce a stable peptized uncoagulated latex which comprises (a) peptizing, at a temperature in the range of 35° C. to 60° C., an aqueous latex of sulphur modified polychloroprene with a tetra alkyl thiuram disulphide and a dialkyl dithiocarbamate and (b) stopping the peptization by lowering the temperature of the peptized latex before peptization is complete to a temperature less than 20° C. and greater than the temperature which is sufficient to cause the latex to coagulate.

2. A process as claimed in claim 1 wherein the temperature is adjusted to between 10° C. to 12° C.

3. A process as claimed in claim 1 wherein the latex is peptised with tetra ethyl thiuram disulphide and dimethyl ammonium dimethyl dithiocarbamate.

4. A process for the production of a peptized sulphur modified polychloroprene latex which comprises (a) peptizing at a temperature in the range of 35°–60° C. an aqueous latex of sulphur modified polychloroprene with a tetra alkyl thiuram disulphide and a dialkyl dithiocarbamate, (b) stopping the peptization by lowering the temperature of the peptized latex before peptization is completed to a temperature of less than 20° C. and greater than the temperature which is sufficient to cause the latex to coagulate and, (c) maintaining the latex below 20° C. while the sulphur modified polychloroprene is isolated therefrom.

References Cited

UNITED STATES PATENTS 3,105,055  9/1963  Aho _____ 260—79.5
3,318,832  5/1967  Sparks et al. _____ 260—79.5
3,320,201  5/1967  Sparks et al. _____ 260—79.5

JAMES A. SEIDLECK, Primary Examiner

U.S. Cl. X.R.

260—30.8, 79.5